United States Patent
Krupinski

(10) Patent No.: US 11,208,302 B2
(45) Date of Patent: Dec. 28, 2021

(54) METHOD FOR MONITORING A WORKING MACHINE

(71) Applicant: Liebherr-Werk Biberach GmbH, Biberach an der Riss (DE)

(72) Inventor: Jacek Krupinski, Trier (DE)

(73) Assignee: Liebherr-Werk Biberach GmbH, Biberach an der Riss (DE)

(*) Notice: Subject to any disclaimer, the term of this patent is extended or adjusted under 35 U.S.C. 154(b) by 0 days.

(21) Appl. No.: 16/087,843

(22) PCT Filed: Mar. 23, 2017

(86) PCT No.: PCT/EP2017/000364
§ 371 (c)(1),
(2) Date: Sep. 24, 2018

(87) PCT Pub. No.: WO2017/162336
PCT Pub. Date: Sep. 28, 2017

(65) Prior Publication Data
US 2019/0106302 A1    Apr. 11, 2019

(30) Foreign Application Priority Data

Mar. 23, 2016  (DE) ..................... 10 2016 003 566.8

(51) Int. Cl.
*B66C 15/06*     (2006.01)
*B66C 13/46*     (2006.01)
(Continued)

(52) U.S. Cl.
CPC ............ *B66C 15/065* (2013.01); *B66C 13/46* (2013.01); *G02B 6/34* (2013.01); *G07C 5/085* (2013.01); *G07C 5/0808* (2013.01)

(58) Field of Classification Search
CPC ......... B66C 15/065; B66C 13/46; G02B 6/34; G07C 5/0808; G07C 5/085
(Continued)

(56) References Cited

U.S. PATENT DOCUMENTS 4,222,491 A * 9/1980 Geppert ................ B66C 23/905
                                                             212/276
6,549,139 B2    4/2003 Shaw, Jr.
(Continued)

FOREIGN PATENT DOCUMENTS

CN        102826452 A      12/2012
DE     102005049436 A1      4/2007
(Continued)

OTHER PUBLICATIONS

ISA European Patent Office, International Search Report Issued in Application No. PCT/EP2017/000364, dated Jun. 21, 2017, WIPO, 6 pages.
(Continued)

*Primary Examiner* — Kam Wan Ma
(74) *Attorney, Agent, or Firm* — McCoy Russell LLP

(57) ABSTRACT

The invention relates to a method for monitoring a working machine, in particular a crane, which is equipped with two or more individual elements for use when in operation, wherein a working machine monitoring means unambiguously identifies one or more elements equipping the machine and determines their times of operation, and the determined time of operation of at least one of the element is transmitted together with identification information to storage means for establishing an operation log of the element.

19 Claims, 3 Drawing Sheets

(51) Int. Cl.
    *G02B 6/34*     (2006.01)
    *G07C 5/08*     (2006.01)

(58) Field of Classification Search
    USPC .......................................................... 340/685
    See application file for complete search history.

(56) References Cited

U.S. PATENT DOCUMENTS

| | | | | |
|---|---|---|---|---|
| 7,782,014 | B2* | 8/2010 | Sivertsen | ................ B60L 58/22 320/118 |
| 10,472,214 | B2* | 11/2019 | Hess | ..................... B66C 23/905 |
| 2002/0175824 | A1 | 11/2002 | Shaw | |
| 2004/0148083 | A1 | 7/2004 | Arakawa et al. | |
| 2005/0253703 | A1* | 11/2005 | He | ............................. G01S 5/02 340/539.13 |
| 2007/0094089 | A1 | 4/2007 | Wilbrink et al. | |
| 2008/0061959 | A1 | 3/2008 | Breed | |
| 2008/0173607 | A1* | 7/2008 | Duncan | .................. B66C 13/20 212/271 |
| 2010/0012610 | A1* | 1/2010 | Rudy | .................... B66C 23/905 212/270 |
| 2010/0044332 | A1 | 2/2010 | Cameron | |
| 2014/0183151 | A1* | 7/2014 | Weckbecker | ........... B66C 23/80 212/276 |
| 2015/0112638 | A1* | 4/2015 | Morrow | .................. B66C 13/46 702/182 |
| 2015/0149026 | A1 | 5/2015 | Oswald et al. | |
| 2016/0034730 | A1* | 2/2016 | Delplace | .................. G01S 19/13 340/8.1 |
| 2017/0036894 | A1* | 2/2017 | Braun | ..................... B66C 23/36 |
| 2017/0260029 | A1* | 9/2017 | Edeler | ..................... B66C 13/16 |
| 2017/0369287 | A1* | 12/2017 | Krupinski | ............. B66C 15/065 |

FOREIGN PATENT DOCUMENTS

| | | |
|---|---|---|
| DE | 102012025111 A1 | 6/2014 |
| WO | 2005098515 A1 | 10/2005 |

OTHER PUBLICATIONS

Intellectual Property of India, Office Action Issued in Application No. 20187037836, dated Mar. 2, 2021, 8 pages.

* cited by examiner

Fig. 1

METHOD FOR MONITORING A WORKING MACHINE

CROSS-REFERENCE TO RELATED APPLICATIONS

The present application is a U.S. National Phase of International Patent Application Serial No. PCT/EP2017/000364, entitled "METHOD FOR MONITORING A WORKING MACHINE," filed on Mar. 23, 2017. International Patent Application Serial No. PCT/EP2017/000364 claims priority to German Patent Application No. 10 2016 003 566.8, filed on Mar. 23, 2016. The entire contents of each of the abovementioned applications are hereby incorporated by reference in their entirety for all purposes.

TECHNICAL FIELD

The invention relates to a method of monitoring a work machine, in particular a crane, that is assembled from two or more individual elements for use in work.

BACKGROUND AND SUMMARY

Certain work machines are assembled from a plurality of machine elements to adapt the machine to the pending operation purpose in dependence on the application. Cranes serve as an example, in particular lattice cranes that can be flexibly assembled from any desired number of lattice elements, whereby the tower height, boom length, and boom type can be particularly simply coordinated with the respective application purpose. In addition to lattice pieces, other machine elements can also be understood as elements that are assembled variably and directly before each crane use. Ballast elements are named as a further non-exclusive example whose number and total weight are determined in dependence on the load to be suspended or on the crane geometry.

As a rule, operators of such work machines keep a plurality of elements available in their fleets to assemble the machines at short notice and flexibly depending on the desired operation purpose. The desired assembly of the respective work machine is transported to the operating site and installed on site. The keeping available of larger numbers of elements that can be assembled has the result that they have different lengths of use over the years since normally not all the available elements are put to use uniformly. Different operation purposes furthermore mean different strains for the individual elements; for example, lattice elements for the crane tower or for the boom are not necessarily installed at the same position for every use in work. There are consequently different strains on the elements used. Wear and thus the future rated capacity of the elements are therefore individual for all the elements and are difficult to manage. If the lengths of use and the strains over the service life of the individual elements are not exactly documented by hand, no exact assessment of the respective element can take place with respect to its service life. The elements therefore have to be replaced at an early time for safety reasons.

A further aspect in the assembling of a work machine, in particular of a crane, comprises the fact that the elements of the work machines are assembled according to the specifications in the operating instructions and the matching load curve is subsequently manually determined and set in the crane control. This procedure is, however, time consuming and prone to error since mistakes and incorrect inputs cannot be precluded due to the involvement of the crane operator.

The present invention therefore deals with the object of providing a suitable method that enables an automatic monitoring of the work machine, i.e. of the assembled elements.

This object is achieved by the method of monitoring a work machine, in particular a crane, that is assembled from two or more individual elements for use in work, wherein a monitoring device of the work machine unambiguously identifies one or more assembled elements and determines their length of use, with the determined length of use of at least one element being transmitted together with identification information to a storage device for preparing a log of use of the element. Advantageous embodiments of the method are the subject of the dependent claims.

In accordance with the invention, a method is provided of monitoring a work machine, in particular a crane, particularly preferably a tower crane, mobile crane, or crawler crane, that is assembled from two or more individual elements for use in work. The respective individual elements are, for example, lattice elements for setting up a crane boom, a crane tower, or any other components of the work machine such as ballast elements, guying parts, support elements, attachments, etc. that can be installed as required depending on the machine deployment.

A monitoring means is additionally provided at the work machine that unambiguously identifies one or more assembled elements and determines their length of use. The length of use preferably relates to the time over which the individual element remains at the work machine in the assembled state. A recording of the actual operating period at the work machine under the influence of a load is additionally conceivable.

The identification of the assembled elements and the subsequent association of the individual length of use for each assembled element provide a number of options for the monitoring of the work machine or of individual elements. Further in accordance with the invention, the determined length of use of at least one elements together with its identification information is transmitted to a storage means for the preparation of a log of use of the element. The log of use not only includes the recently determined length of use, but also lengths of use of preceding machine deployments, either with the same work machine or with a different work machine.

There is thereby the possibility that all the lengths of use of the assembly element over its service life are present in completely documented form within the storage means. The total procedure is fully automated and the information is available for access for post-processing and analysis in the storage means. Ideally all of the elements that can be assembled, or at least a large proportion of them, can be identified so that comprehensive information on the elements can be provided to the machine operator. This facilitates the total fleet management of his fleet. This requirement ideally allows a prognostic examination of the possible durability of all the available elements.

The storage means used can either be in a central management unit that is communicationally connected to one or more monitoring means of different work machines. This is in particular expedient when the work machine and the central management unit are the responsibility of a fleet operator. The elements of all the work machines can thereby be centrally managed. The central management unit could naturally also be offered from the manufacturer's side.

It is alternatively conceivable that the storage means is installed at the work machine itself. An integration of separate storage means in each element itself is conceivable so that each assembly element itself manages its prepared log of use and keeps it available for external access. Nor does anything speak against an integration of the storage means in the monitoring means.

The monitoring means is preferably a component of the work machine control.

It is expedient for the analysis of the assembly elements to provide further information in addition to the length of use. In this connection, for example, the exact installed position of the assembly element at the work machine during the machine operation is of central importance. Taking this into account allows an exact conclusion on the load on the element occurring in machine operation. The monitoring means preferably determines the exact installed position of the assembly element at the work machine for each crane operation. This position information is transmitted by the monitoring means together with the length of use and the identification information to the storage means.

It is additionally expedient if one or more load collectives are detected by the monitoring means for at least some of the assembled elements and are transmitted to the storage means. Load collectives have a substantial influence on the actual load of the assembled elements and determine the durability of these elements to a substantial degree.

An evaluation unit can be provided for the further processing of the data stored in the storage means. The evaluation unit preferably carries out a load-induced state analysis of the individual assembly elements to assess their future load capability/rated capacity. The machine operator can thereby be provided with reliable information on the individual elements. The information allow a conclusion on whether individual elements are still suitable for further planned uses of the work machine without a safety risk being taken during the machine operation. Otherwise, a replacement of the elements in question can be recommended to the machine operator.

It is in particular expedient if information is present in the evaluation unit that describes the load on an assembled element per operational deployment or the total load over the total time of use. The load can in particular be determined using the detected installed position at the work machine and using further information describing the work operation. The actual load can either be determined by the monitoring means and can be communicated to the evaluation unit or can alternatively only be calculated in the evaluation unit itself.

Some important factors for the load analysis are the total load on the machine, i.e. for example, a suspended load, and the complete machine configuration and machine movements to be carried out. External influences can also play a role. The load for individual elements can either be calculated or can be read off using a stored load table.

In addition to the state analysis of the elements, an assessment of the profitability of one or more elements can alternatively or additionally likewise take place within the evaluation unit. The data stored on the storage means are also used, with a determination in particular being made using the stored length of use whether the corresponding assembly element has been sufficiently used. The profitability can furthermore be determined in combination with stored information with respect to the recorded yields per individual assembly element. It can, for example, be seen from this whether the use of the respective element is actually profitable over the period of use.

It is likewise conceivable to use costs incurred for the element for this assessment; for example, costs for a required replacement and/or putting into operation and/or servicing of the element. The machine operator can determine with reference to this analysis whether individual assembly elements are profitable for him from an economic viewpoint or whether they should possibly be replaced for safety reasons.

Additionally or alternatively, the evaluation unit can likewise be used to check the reliability of the currently assembled configuration of the work machine, in particular as to whether it satisfies prescribed safety provisions. A check is, for example, made in this connection whether all the assembled elements can be directly and unambiguously identified by the monitoring means. If individual elements that can be assembled cannot be identified, for example, this could be interpreted as an indication of a fake.

A check and a determination can further be made whether the identified assembled elements are permitted in their respective installed position. There is generally the possibility of determining the specific assembly state of the work machine exactly and in an automated manner. Control data that are relevant to the operation, that are dependent on the assembly, and that are required by the machine control for the machine operation can be provided in an automated manner on the basis of this information; for example, a required payload table for the operation of the work machine. Any desired assembly-dependent data can generally be provided to the work machine control in dependence on the information provided by the monitoring means.

Different measures can be taken for the event that a non-identifiable element is recognized by the monitoring means; for example, this event can be stored in a storage means and can be kept available for later access. The generation of a corresponding warning to the machine operator is likewise conceivable. Ideally, the monitoring means or the machine control in this case requires a manual release of the operation by the machine operator so that his knowledge is ensured.

The identification of the elements that can be assembled can take place, for example, using encoded information that is expediently present directly and immediately at the individual elements. The transmission of corresponding information can take place, for example, by means of optical fibers that provide a transmission path from the individual elements to the monitoring means. An exchange of information by optical fiber can likewise be provided between individual elements so that the delivery of the information to the monitoring means takes place by multi-hop transmission.

It is conceivable in this connection that optical fibers are used having a prismatic branch per individual element that can be assembled. The identification information is collected in the monitoring means and is optionally forwarded via a further communication connection to a central evaluation unit. This transmission path can take place in a wired or also radio-based manner. All known transmission technologies are conceivable.

Alternatively, the transmission of the identification information from the elements that can be assembled to the monitoring means can likewise take place in a radio-based manner, for example by means of contactless energy transmission.

The present information additionally relates to a work machine, in particular to a crane, particularly preferably to a revolving tower crane, a mobile crane, or a crawler crane, having a monitoring means and one or more assembly elements that can be identified. The work machine is accordingly suitably equipped with corresponding means for carrying out the method in accordance with the present invention. The advantages and properties of the work machine accordingly correspond to the already explained properties of the method in accordance with the invention so that a repeat description at this point will be dispensed with.

One or more optical fibers that are preferably fastened to the individual elements can be installed for the transmission of information from the assembled elements to the monitoring means. An exchange of information by optical fiber can likewise be provided between individual elements so that the delivery of the information to the monitoring means takes place by multi-hop transmission. The encoded identification information of an element can thus, for example, be transmitted to the monitoring means indirectly via a plurality of interposed elements that can be assembled.

Individual elements are frequently installed behind one another, for example on the setting up of a crane tower or of a boom from a plurality of lattice pieces. The optical fibers of individual elements are here fastened such that a continuous transmission path of the optical fiber is joined by the installation of the elements. The optical fibers preferably have suitable coupling means for this purpose that permit releasable connections of the optical fibers of different elements.

It is conceivable in this connection that optical fibers are used having a prismatic branch per individual element that can be assembled, with said prismatic branch imaging the encoded information.

Alternatively, a contactless radio transmission system can be provided between the monitoring means and assembled elements. Such a radio transmission system is based, for example, on the basis of an RFID system or of an LWID system (RuBee) or of a comparable system. The use of transmission systems based on wireless LAN or on Bluetooth is likewise conceivable. An ad hoc network is preferably set up by the monitoring means and the elements that can be assembled so that small transmission paths are sufficient between individual elements or the elements and the monitoring means.

The invention finally comprises a system comprising a central management unit and at least one work machine in accordance with the present invention suitable for carrying out the method in accordance with the invention.

Further advantages and properties of the invention will be explained in more detail with reference to an embodiment shown in the drawings.

BRIEF DESCRIPTION OF THE FIGURES

FIG. 1 shows a sketched representation of the tower crane in accordance with the invention for the carrying out of the method in accordance with the invention.

DETAILED DESCRIPTION

Figure 1:
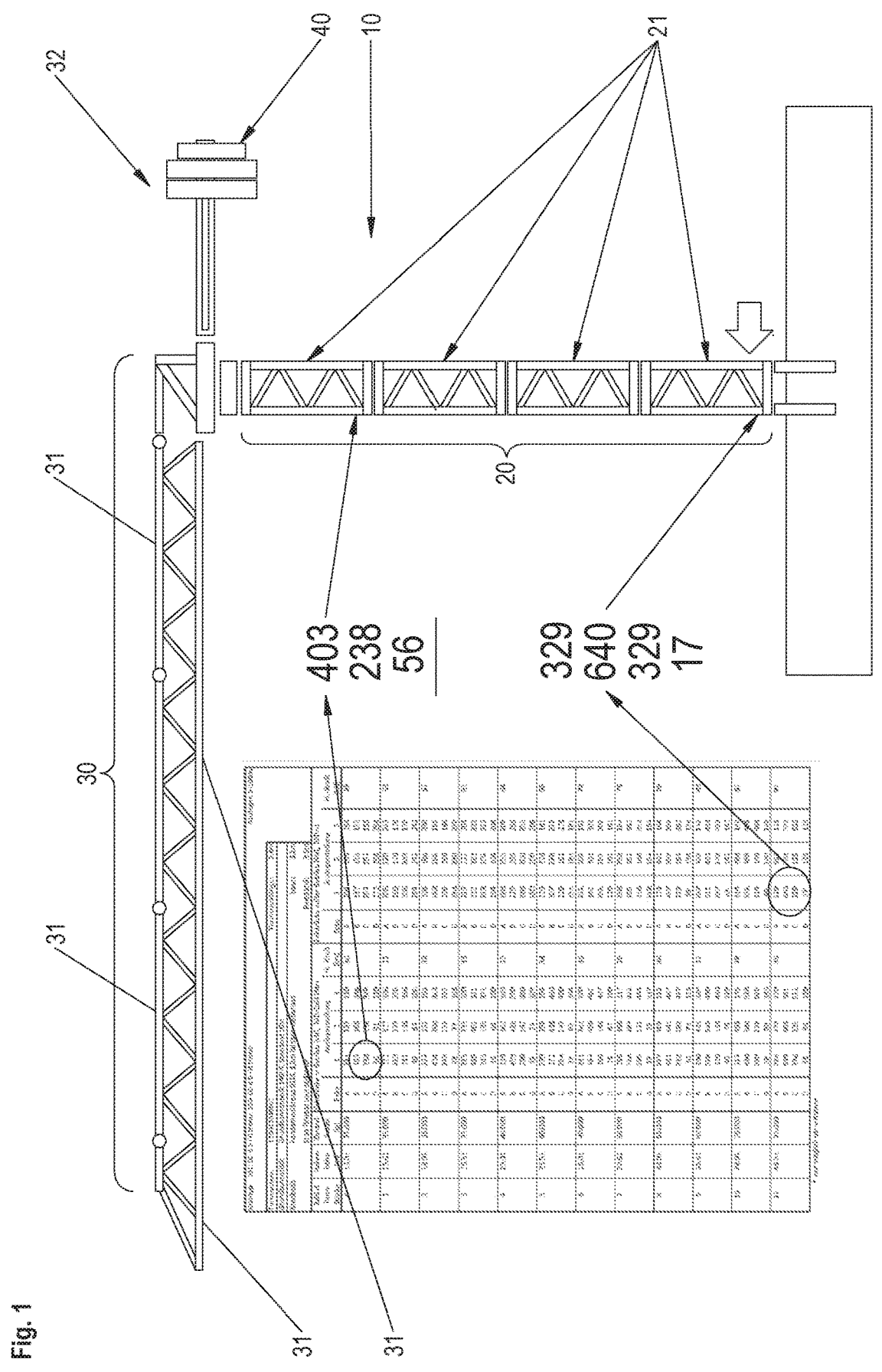
Figure 2:
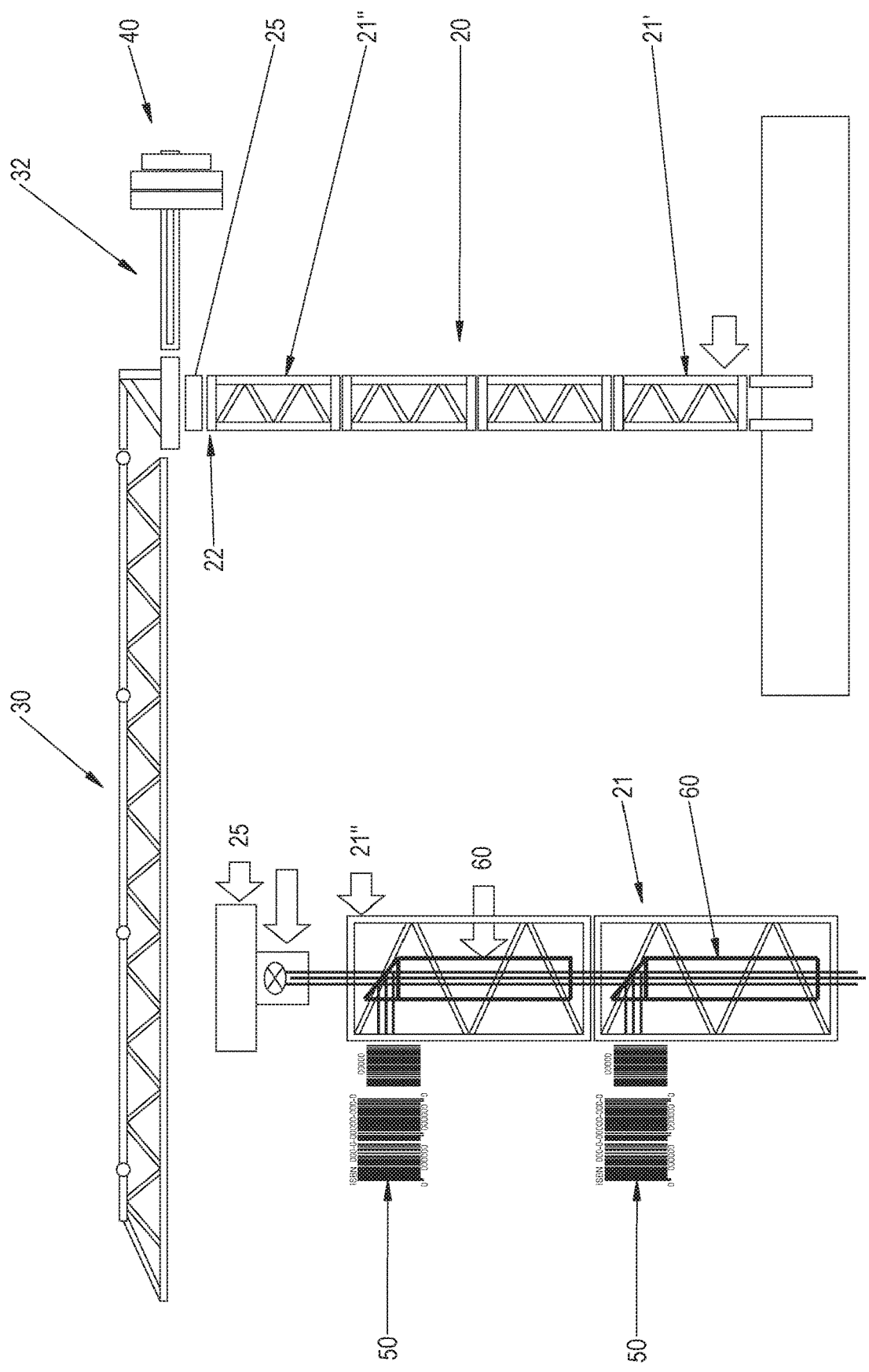
FIG. 2 shows the crane in accordance with FIG. 1 using an optical fiber system for the transmission of encoded identification information.

FIG. 1 shows a sketched representation of the tower crane 10 in accordance with the invention whose crane tower 20 is typically assembled from individual lattice elements 21. As shown in FIG. 2, the boom 30 having the counter boom 32 is located at the tower head 22 and said boom and counter-boom are rotatably fastened to the tower head 22 via the slewing platform 25. The boom 30 also consists of individual lattice pieces. The desired number of ballast elements 40 is suspended at the counter-boom 32 in dependence on the boom length and on the load bearing capacity. In reality, the tower crane 10 comprises a plurality of further assembly elements that can likewise be included in the monitoring in accordance with the invention. For reasons of simplicity, the invention will be explained in the following with reference to the lattice elements 21, 31, but should by no means be understood as only restricted thereto.

The lattice pieces 21, 31 of the crane 10 are equipped with an information system. This information system should transmit information in a cascade manner via the installed lattice pieces 21, 31 to the central crane control. To be able to unambiguously identify the installed lattice pieces 21, 31, they each comprise an individually encoded piece of identification information 50, 51 that is present at the lattice piece 21, 31, itself. This information in particular permits an unambiguous identification of the individual assembly elements 21, 31. In addition, due to the data exchange between the crane control and the assembly elements 21, 31, their specific installed position at the crane 10 can be determined.

The transmission of the encoded identification information 50 is effected by optical fibers 60 in the embodiment in accordance with FIG. 2. Individual optical fibers of the lattice pieces 21, 31 are here arranged such that they form a continuous transmission path to the transmission and reception unit 71 of the crane control on the tower installation or boom installation. Separate pools of light can optionally be used for the boom 30 and the crane tower 20.

There are characteristic prismatic branches for each lattice piece 21, 31 that form the individual pieces of identification information for each lattice piece 21, 31. This branch thus influences the light signals that are transmitted from the crane control by means of the transmission and reception unit 71 via the optical fiber paths 60 so that which lattice pieces 21, 31 are connected to the optical fibers 60 and at which position they are present within the crane tower 20 or the boom 30 can be recognized.

Further information that inter alia comprises the length of use of the lattice pieces 21, 31 at the crane 10, i.e. the operating time and the out of operation time of the crane 10, are added to this received information in the crane control. This information is additionally expanded by information on load collectives that were present at the respective lattice piece 21, 31 during the crane operation.

These bundled data packets, i.e. the identification information and the further information with respect to the length of use, the load collectives, and the installed position, are forwarded by the crane control via the communications module 70 to a central database, not shown, for the subsequent evaluation. The transmission can take place in a radio based or wired manner. The database can be implemented in a central management unit that is installed at the manufacturer's or also at the crane owner's. In addition to the database, an evaluation unit is provided that presents an exact log of use and load for every single lattice piece 21, 31 of the crane 10 from the data transmitted.

Since each lattice piece 21, 31 is subjected to different loads in use, the tower element 21' is, for example, exposed to much higher loads than the tower element 21" in the direct proximity of the tower tip, it is important that the lengths of use and the loads for every signal element 21, 31 are documented separately and sufficiently exactly since otherwise no reliable statement can be made on the future durability/rated capacity of the lattice pieces 21, 31 and the necessity of a replacement may not be recognized in time. If the renter has a number of elements 21, 31 of the same construction type, it is possible that one element 21 is always used while further elements 21 are used more rarely or never.

A judgment can now be made very precisely and in an automated manner on the technical suitability of individual lattice elements 21, 31 over their service life due to the method in accordance with the invention.

There is optionally the possibility of commercially evaluating the existing crane fleet at the owner's. The profitability of each individual element 21, 31 (system element, tower element) can be calculated by a comparison of the length of use per lattice piece 21, 31 and of the profit recorded therewith. The owner is assisted in his decision on possible investments or on a selling on.

There is furthermore the possibility of detecting the actual configuration of the crane 10 and of subsequently confirming it on the basis of the transmitted data. The specific tower composition or boom composition, the counter-boom, and the counter-ballast can in particular be automatically determined using the information and the load curve matched thereto can be calculated or provided. This automated procedure avoids any incorrect operation due to incorrect inputs of the crane operator.

In addition, the use of fakes for individual elements 21, 31 is made more difficult by the method in accordance with the invention. If, for example, unidentifiable elements 21, 31 are located at the crane 10, this event is automatically detected and recorded and the release for operation has to be manually confirmed by the crane operator. The crane operator is thereby automatically advised of unidentifiable elements of the crane 10.

Figure 3:
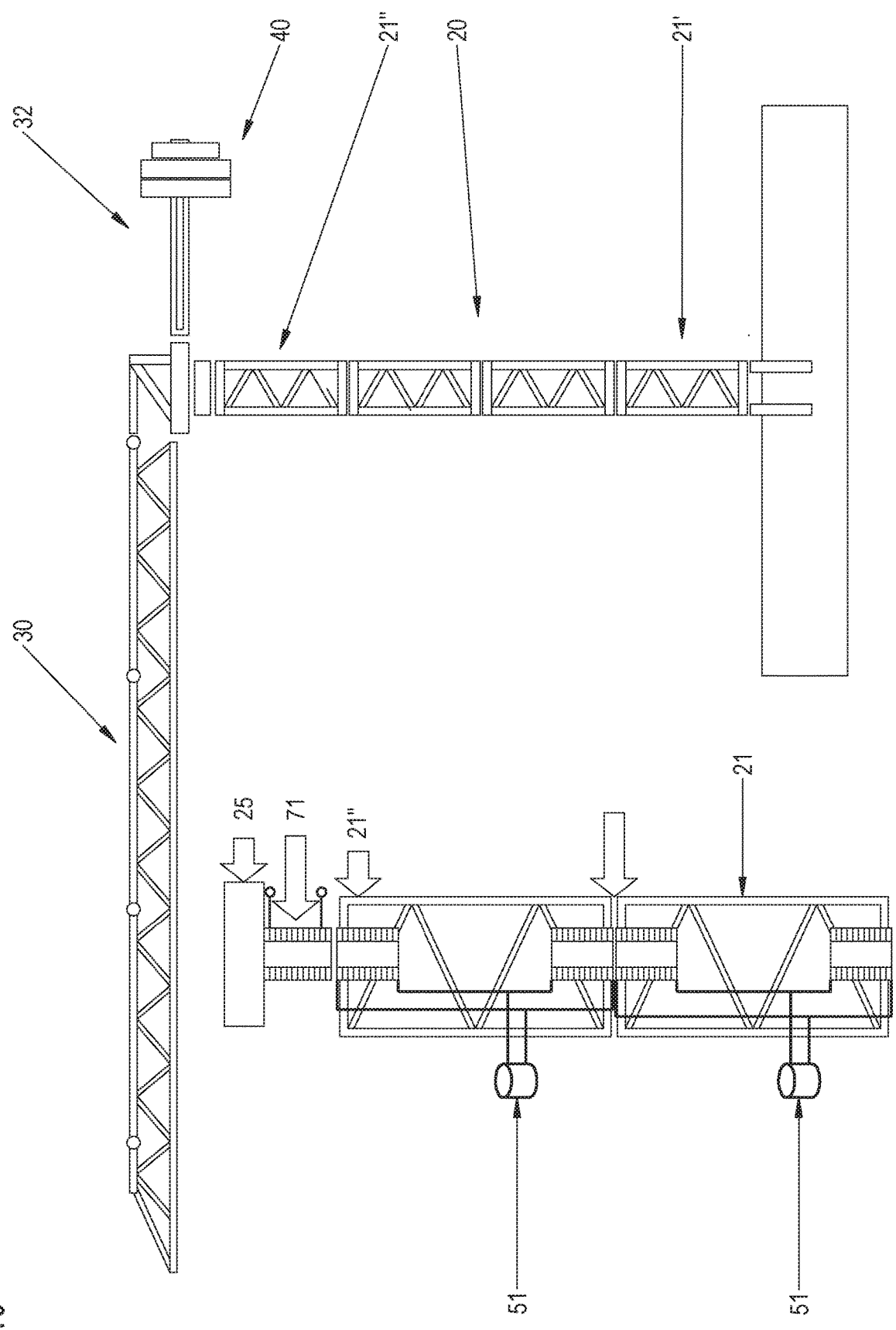
FIG. 3 shows the crane in accordance with FIG. 1 with contactless energy transmission for the transmission of encoded identification information.

An alternative possibility for communication by means of optical fiber comprises the use of a contactless energy transmission between the individual assembly elements 21, 31 such as schematically illustrated with reference to FIG. 3. A contactless radio transmission of the encoded identification information 51 that is stored in a separate memory unit 51 of the observed lattice element 21, 31 takes place between the individual lattice elements.

Since the lattice pieces 21, 31 can also communicate with one another in this manner, an exchange of information of the bottommost lattice element 21' with the furthest transmission path to the transmission and reception unit 71 can also take place by multi-hop with the aid of the lattice elements 21, 21" disposed therebetween. An ad hoc network is consequently set up by the lattice elements 21, 31 and the transmission and reception unit 71.

Conceivable contactless energy transmission systems can, for example, be based on the known RFID technology. Systems based on wireless LAN or Bluetooth as well as any other suitable radio-based transmission systems are likewise conceivable.

The invention claimed is:

1. A method of monitoring a work machine assembled from two or more individual elements, comprising:
receiving information from connected elements of the assembled work machine at a monitoring device of the work machine, the information sent through the connected elements in series and comprising identifiers for the connected elements, and the connected elements modifying the information before the information is further transmitted;
automatically determining the position of the connected elements within the assembled work machine based on the modified information;
using the monitoring device of the work machine to: identify one or more of the connected elements, determine a length of use of one or more of the connected elements, and determine a load history of an individual connected element based on a position of the individual connected element within the assembled work machine, wherein the work machine is a crane; and
transmitting the determined length of use of at least one of the connected elements together with identification information of the at least one of the connected elements to a storage device for preparing a log of use of the at least one of the connected elements.

2. The method in accordance with claim 1, wherein the storage device is within a central management unit that is connected or is connected communicationally to one or more monitoring devices of different work machines and/or that is attached to the connected elements.

3. The method in accordance with claim 1, wherein the monitoring device is a component of a work machine control.

4. The method in accordance with claim 1, further comprising determining a composition of the work machine based on determined positions of the connected elements, and
calculating or providing a load curve based on the determined composition of the work machine,
wherein the position of the connected elements is determined by the monitoring device during machine deployment and is transmitted to the storage device.

5. The method in accordance with claim 1, wherein load collectives for at least some of the connected elements are determined by the monitoring device during machine deployment and are transmitted to the storage device.

6. The method in accordance with claim 1, wherein an evaluation unit performs a load-induced state analysis of the connected elements using data stored in the storage device to assess their future load capability/rated capacity, with the evaluation unit and/or the monitoring device seeing an exact load of one of the connected elements per operational use with reference to tabular information.

7. The method in accordance with claim 6, wherein the evaluation unit and/or the monitoring device sees an exact load of one or more of the connected elements per operational use with reference to detected installation position and further information describing work operation.

8. The method in accordance with claim 1, wherein an evaluation unit performs an assessment of the profitability of one or more of the connected elements with reference to data stored in the storage device including one or more of: the stored lengths of use, the yields recorded and costs incurred, wherein costs incurred include one or more of a new purchase, a putting into operation, and a servicing.

9. The method in accordance with claim 8, wherein a current configuration of the work machine is determined and checked for reliability by the monitoring device and/or by the evaluation unit.

10. The method in accordance with claim 9, wherein data required for operation and dependent on assembly of the work machine are released and/or provided by the monitoring device and/or by the evaluation unit in dependence on the determined configuration.

11. The method in accordance with claim 10, wherein the data required for operation and dependent on the assembly is a payload curve.

12. The method in accordance with claim 8, wherein the monitoring device and/or the evaluation unit makes a check after assembly of the work machine whether all the connected elements are identifiable and in the event of an unidentifiable element, a piece of information is transmitted to the evaluation unit and/or a manual release of work operation by a machine operator is requested and/or a communication is output to the machine operator.

13. The method in accordance with claim 1, wherein an identification of the connected elements takes place by means of encoded information that is present at the connected elements and that is transmitted via optical fibers and/or via contactless energy transmission between individual connected elements and/or between the connected elements and the monitoring device.

14. A work machine comprising:
one or more identifiable assembly elements, wherein the work machine is assembled from two or more individual elements;
connected elements of the work machine transmitting information in series through optical fibers to a monitoring device of the work machine, the information comprising identifiers for the connected elements, and the connected elements modifying the information before the information is further transmitted;
the monitoring device of the work machine:
identifying one or more of the connected elements,
determining a length of use of one or more of the connected elements,
determining a load history of an individual connected element based on a position of the individual connected element within the assembled work machine, wherein the work machine is a crane, and
transmitting the determined length of use of at least one of the connected elements together with identification information to a storage device for preparing a log of use of the at least one connected elements, and
automatically determining the position of one or more of the connected elements within a tower or boom of the assembled work machine based on the modified information;
the storage device is within a central management unit that is connected or is connected communicationally to one or more monitoring devices of different work machines and/or that is attached to the connected elements.

15. The work machine in accordance with claim 14, wherein one or more optical fibers are provided for transmitting encoded identification information of at least one of the connected elements to the monitoring device and/or to at least one further of the connected elements, and
the position of the one or more connected elements within a tower or boom of the assembled work machine is determined based on characteristic signals from the one or more optical fibers.

16. The work machine in accordance with claim 15, wherein one or more connected elements are installed behind one another and the optical fibers are fastened to individual connected elements such that a continuous optical fiber transmission path is formed by installation of the connected elements.

17. The work machine in accordance with claim 14, wherein a contactless radio transmission system is provided between the monitoring device and the connected elements or between individual connected elements.

18. The work machine in accordance with claim 14, wherein the work machine is a tower crane, a mobile crane, or a crawler crane.

19. A system having at least one central management unit and least one work machine, comprising:
a monitoring device and two or more assembly elements,
connected elements of the work machine transmitting information in series to a monitoring device of the work machine, the information comprising identifiers for the connected elements, and the connected elements modifying the information before the information is further transmitted, and
the monitoring device of the work machine:
identifying the two or more of the connected elements,
determining a length of use of one or more of the connected elements,
determining a load history of an individual connected element based on a position of the individual connected element within the assembled work machine, wherein the work machine is a crane,
transmitting the determined length of use of the two or more connected elements together with identification information to a storage device for preparing a log of use of one of the connected elements,
determining the installed position of one of the connected elements within a tower or boom of the assembled work machine based on the modified information during machine deployment, and
transmitting the installed position to the storage device.

* * * * *